Aug. 11, 1953   R. P. INGRAHAM   2,648,066
MAGNETIC NAIL HOLDER
Filed Aug. 18, 1951
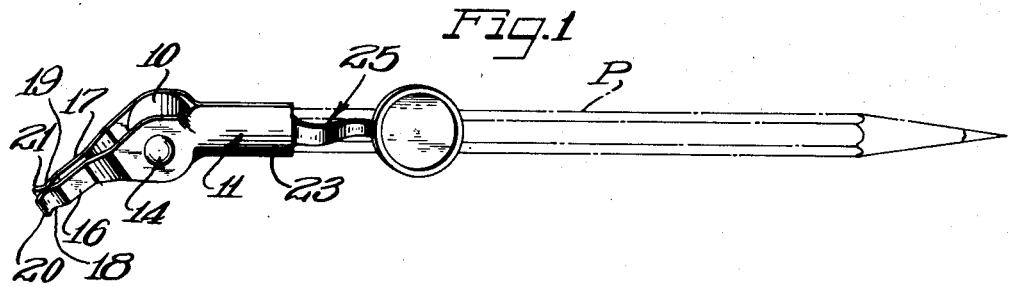
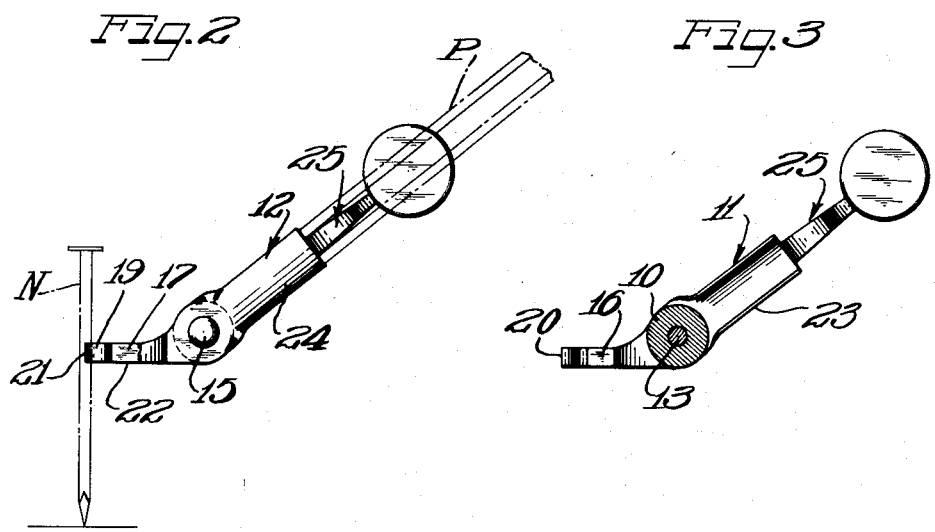
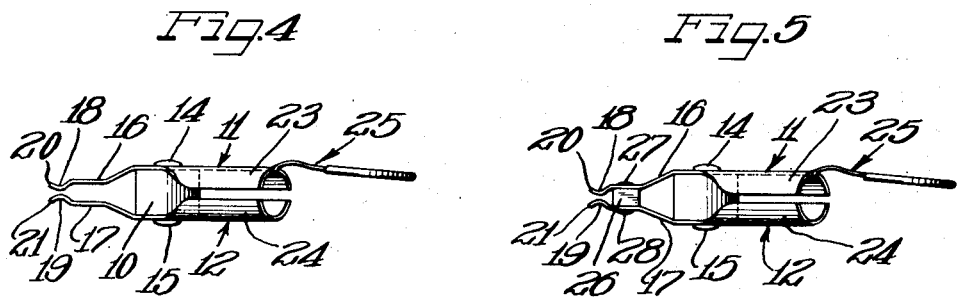
Inventor:
Robert P. Ingraham
by Hill, Sherman, Meroni, Gross & Simpson Attys Patented Aug. 11, 1953

2,648,066

UNITED STATES PATENT OFFICE 2,648,066

MAGNETIC NAIL HOLDER

Robert P. Ingraham, San Antonio, Tex.

Application August 18, 1951, Serial No. 242,550

4 Claims. (Cl. 1—49.8)

1

The present invention is directed to a magnetic type nail holder for positioning a nail and for holding the nail in the desired position along the surface of the object into which the nail is to be driven.

The improved nail holder of the present invention includes a pair of confronting nail-engaging arms which are magnetized to receive a ferromagnetic object such as a nail between the end portions thereof and hold it in a steady position by virtue of the magnetic attraction of the magnetized arms for the nail. The nail holder assembly of the present invention also includes a pair of oppositely disposed handle-receiving arms extending from the nail supporting arms at an obtuse angle (i. e., an angle larger than 90° but less than 180°) so that in use, a handle member inserted within the handle receiving portion supports the nail holder assembly without the danger of having the hammer strike the fingers of the person using the magnetic nail holder assemble.

Another feature of the present invention resides in shaping the nail engaging arms of the nail holder assembly in such a manner that they lie flat against the surface into which the nail is to be introduced, that is, in a plane substantially normal to the axis of the nail received between the nail engaging portions.

An object of the present invention is to provide an improved magnetic nail holder assembly provided with a support or handle member extending at an obtuse angle to the nail engaging arms of the nail holder assembly.

A further object of the present invention is to provide a permanently magnetized nail holder assembly having converging nail engaging arms arranged to accommodate any size of nail.

Another object of the present invention is to provide an improved magnetic nail holder assembly which is compact, economical to manufacture, and rugged in use.

A further description of the present invention will be made in connection with the attached sheet of drawings in which:

Figure 1 is a view in perspective of the improved nail holder of the present invention indicating the manner in which the same is attached to the end of an ordinary pencil;

Figure 2 is a view in elevation of the nail holder assembly of the present invention illustrating the manner in which the nail engaging arms of the assembly position the nail against the surface into which the nail is to be driven;

Figure 3 is a cross-sectional view, with parts in elevation of the improved nail holder assembly;

Figure 4 is a plan view of the assembly, illustrating with greater particularity the curvature of the nail engaging arms; and Figure 5 is a plan view of a modified form of the nail holder assembly within the scope of the present invention.

As shown on the drawings:

As shown in Figures 1–4, inclusive, the improved magnetic nail holder assembly of the present invention includes a cylindrical permanent magnet 10 preferably of a material having high field strength, such as an "Alnico" magnet. Secured to the opposite faces of the permanent magnet 10, and hence to the opposite magnetic poles of the magnet, are a pair of sheet metal members 11 and 12 (Fig. 4) of ferromagnetic material such as steel. The magnet 10 has an axial bore which receives a pin 13, the pin extending through the members 11 and 12 and having enlarged end portions 14 and 15 holding the members 11 and 12 against the pole faces of the magnet 10.

The strip members 11 and 12 are suitably crimped, as indicated in Figure 4, to provide a pair of nail engaging converging arms 16 and 17. Near the extreme ends of the arms 16 and 17, the arms are indented as indicated at 18 and 19 to provide an area between the arms of increased magnetic flux density. The extreme ends of the arms 16 and 17 are outwardly tapered as indicated at 20 and 21 so that nails of varying diameters can be received between the ends 20 and 21. As indicated in Figure 2, the nail N is received in the nail holder assembly between the ends 20 and 21 and is held in an upright position by the magnetic flux concentrated between the points 18 and 19. As also indicated in Figure 2, the base edges of the arms 16 and 17, generally indicated at 22, lie in a plane which is substantially normal to the axis of the nail N. With this arrangement, the bottom edges 22 can be laid directly against the surface into which the nail is to be introduced, and the nail will be positioned along a line exactly perpendicular to that surface.

As best indicated in Figure 4, the opposite ends of the sheet metal members 11 and 12 are formed to provide a pair of semi-cylindrical handle receiving members 23 and 24. As best indicated in Figure 2, the handle receiving members 23 and 24 extend at an obtuse angle with respect to the nail holding arms 16 and 17. Thus, when a handle member, which may conveniently be an ordinary pencil P, is received by the handle engaging portions 23 and 24, the nail end can be positioned along the surface with the fingers of the user well removed from the head of the nail. As shown in Figures 1–3, one of the handle engaging portions 23 and 24 may also be provided with a clip 25 of the conventional type used for holding a pencil or similar article in an upright position within a pocket of an article of clothing.

In the embodiment of the invention illustrated in Figure 5, the converging arms 16 and 17 are spaced by means of a non-magnetic spacer element 26, to decrease the flexibility of the nail engaging ends of the arms. The spacer 26 is held in fixed position between the arms 16 and 17 by means of a pin having enlarged end portions 27 and 28 pressing portions of the arms 16 and 17 against the spacer 26.

From the foregoing, it will be appreciated that the magnetic nail holding assembly of my invention is simple in construction, yet rugged in use. By providing the handle engaging members of the assembly at an obtuse angle to the nail engaging portions, the nail to be driven can be conveniently positioned against the surface into which it is to be driven, while the fingers of the user are not in proximity to the head of the nail. Furthermore, by providing the flat bottom edges to the nail holding portions of the holder assembly, the nail can be positioned accurately against the surface in an upright position.

It will be understood that modifications and variations may be effected without departing from the scope of the novel concepts of the present invention.

I claim as my invention:

1. A magnetic nail holder assembly comprising a permanent magnet, a pair of arms secured to opposite poles of said magnet, the ends of said arms being flared outwardly to receive and hold a nail thereagainst, and a handle extending from said arms at an obtuse angle to said arms.

2. A magnetic nail holder assembly comprising a permanent magnet, a pair of converging arms secured to the opposite poles of said magnet, the ends of said arms being flared outwardly to receive and hold a nail thereagainst, the bottom edges of said arms lying in a plane substantially normal to the axis of a nail held between said ends, and a handle portion extending from said arms at an obtuse angle to said arms.

3. A magnetic nail holder assembly comprising a permanent magnet, a pair of converging arms secured to opposite poles of said magnet, the extreme ends of said arms being flared outwardly to receive a nail thereagainst, each of said arms having a pair of extensions extending therefrom at an obtuse angle with respect to the converging portions thereof, said extensions being shaped to receive snugly an elongated supporting member.

4. A magnetic nail holder assembly comprising a permanent magnet, a pair of converging arms secured to opposite poles of said magnet, the ends of said arms being flared outwardly to receive and hold a nail thereagainst, a non-magnetic spacer element secured between said converging arms to hold said ends spaced apart, the bottom edges of said arms lying in a plane substantially normal to the axis of a nail held between said ends, and a handle portion extending from said arms at an obtuse angle to said arms.

ROBERT P. INGRAHAM.

References Cited in the file of this patent

UNITED STATES PATENTS

| Number | Name | Date |
|---|---|---|
| 1,435,885 | Wisroth | Nov. 14, 1922 |
| 1,525,413 | Pearson | Feb. 3, 1925 |
| 2,491,860 | Ingraham | Dec. 20, 1949 |

FOREIGN PATENTS

| Number | Country | Date |
|---|---|---|
| 5,414 | Great Britain | Mar. 13, 1893 |
| 22,446 | Great Britain | Dec. 10, 1900 |